(12) United States Patent
Nam et al.

(10) Patent No.: US 10,196,984 B2
(45) Date of Patent: Feb. 5, 2019

(54) METHOD AND APPARATUS FOR CONTROLLING GAS TURBINE WHEN GAS TURBINE IS STARTED

(71) Applicant: DOOSAN HEAVY INDUSTRIES & CONSTRUCTION CO., LTD., Gyeongsangnam-do (KR)

(72) Inventors: Sam Sik Nam, Daejeon (KR); Jun Chel Park, Daejeon (KR); Jong Seung Park, Daejeon (KR)

(73) Assignee: Doosan Heavy Industries Construction Co., Ltd., Gyeongsangnam-do (KR)

( * ) Notice: Subject to any disclaimer, the term of this patent is extended or adjusted under 35 U.S.C. 154(b) by 803 days.

(21) Appl. No.: 14/570,751

(22) Filed: Dec. 15, 2014

(65) Prior Publication Data

US 2015/0211419 A1    Jul. 30, 2015

(30) Foreign Application Priority Data

Jan. 24, 2014    (KR) ........................ 10-2014-0009020

(51) Int. Cl.
*F02C 7/26* (2006.01)
*F02C 9/00* (2006.01)
(Continued)

(52) U.S. Cl.
CPC .................. *F02C 7/26* (2013.01); *F02C 9/00* (2013.01); *F02C 9/28* (2013.01); *F02C 9/46* (2013.01);
(Continued)

(58) Field of Classification Search
CPC ...... F02C 7/26; F02C 9/00; F02C 9/26; F02C 9/28; F02C 9/46; F05D 2270/04; F05D 2270/042; F05D 2270/09
See application file for complete search history.

(56) References Cited

U.S. PATENT DOCUMENTS 4,672,806 A * 6/1987 Pisano ....................... F02C 9/28
60/773
5,212,943 A    5/1993 Harris
(Continued)

FOREIGN PATENT DOCUMENTS

EP    1 361 351 A2    11/2003
GB       925482 A *    5/1963    ............... F02C 9/36
(Continued)

OTHER PUBLICATIONS

Korean Office Action dated Feb. 18, 2016 corresponding to Korean Patent Application No. 10-2014-0009020.
(Continued)

*Primary Examiner* — Laert Dounis
(74) *Attorney, Agent, or Firm* — INVENSTONE Patent, LLC

(57) ABSTRACT

A method for controlling a gas turbine when the gas turbine is started may include measuring the number of rotations of the gas turbine, determining a target acceleration rate based on the number of rotations of the gas turbine, measuring a current acceleration rate, determining a flow rate of fuel based on a difference between the current acceleration rate and the target acceleration rate, and supplying fuel to the gas turbine at the determined flow rate. The flow rate of the fuel may be determined between a maximum flow rate of the fuel that has been previously stored and a minimum flow rate of the fuel. A temperature of the exhaust gas after controlling the flow rate of the fuel may be monitored.

10 Claims, 6 Drawing Sheets

(51) Int. Cl.
*F02C 9/28* (2006.01)
*F02C 9/46* (2006.01)

(52) U.S. Cl.
CPC ...... *F05D 2260/85* (2013.01); *F05D 2270/04* (2013.01)

(56) References Cited

U.S. PATENT DOCUMENTS

| | | | | |
|---|---|---|---|---|
| 6,230,479 | B1* | 5/2001 | Kawamura | F02C 9/26 60/773 |
| 6,393,355 | B1* | 5/2002 | Muramatsu | F02C 9/28 60/773 |
| 2004/0122581 | A1* | 6/2004 | Hartzheim | F01D 15/10 701/100 |
| 2004/0200206 | A1 | 10/2004 | McKelvey et al. | |
| 2004/0200207 | A1* | 10/2004 | McKelvey | F02C 7/26 60/39.281 |
| 2005/0086942 | A1 | 4/2005 | Adibhatla | |
| 2007/0031238 | A1* | 2/2007 | Fujii | F02C 9/20 415/48 |
| 2011/0282501 | A1* | 11/2011 | Martin | F01D 19/00 700/287 |
| 2013/0227959 | A1* | 9/2013 | Ainslie | F02C 7/26 60/778 |
| 2013/0229759 | A1 | 9/2013 | Whitt, III et al. | |
| 2016/0069276 | A1* | 3/2016 | Djelassi | F02C 9/26 60/776 |

FOREIGN PATENT DOCUMENTS

| | | |
|---|---|---|
| JP | 55-12257 A | 1/1980 |
| JP | 59-015638 A | 1/1984 |
| JP | 05-079350 A | 3/1993 |
| JP | 07-083074 A | 3/1995 |
| JP | 09-287483 A | 11/1997 |
| JP | 2003-214188 A | 7/2003 |
| JP | 2003-278560 A | 10/2003 |
| JP | 2004-003474 A | 1/2004 |

OTHER PUBLICATIONS

Chinese Office Action dated Dec. 24, 2015 in corresponding Chinese patent application No. 201510001762.8.
Japanese Office Action dated Dec. 28, 2015 in corresponding Japanese patent application No. 2014-238661.
Korean Office Action dated Jul. 27, 2015 corresponding KR Patent Application No. 10-2014-0009020.
Office Action issued on Dec. 26, 2014 in corresponding KR Patent Application No. 10-2014-0009020.
An extended European search report issued by the European Patent Office dated Jun. 22, 2015 in connection with European patent application No. 15151814.9.

* cited by examiner

[FIG. 1]
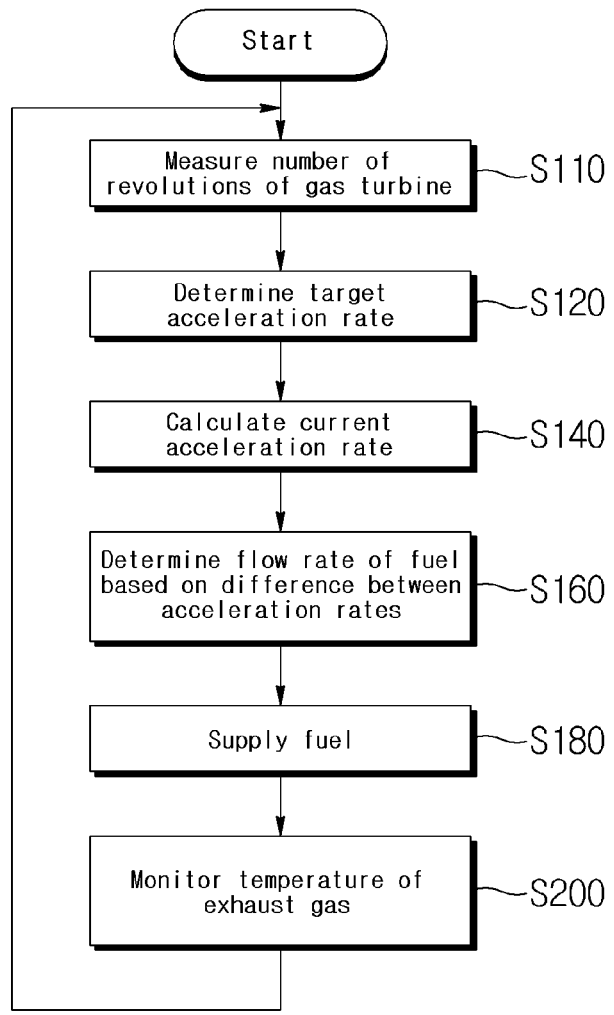

[FIG. 2]
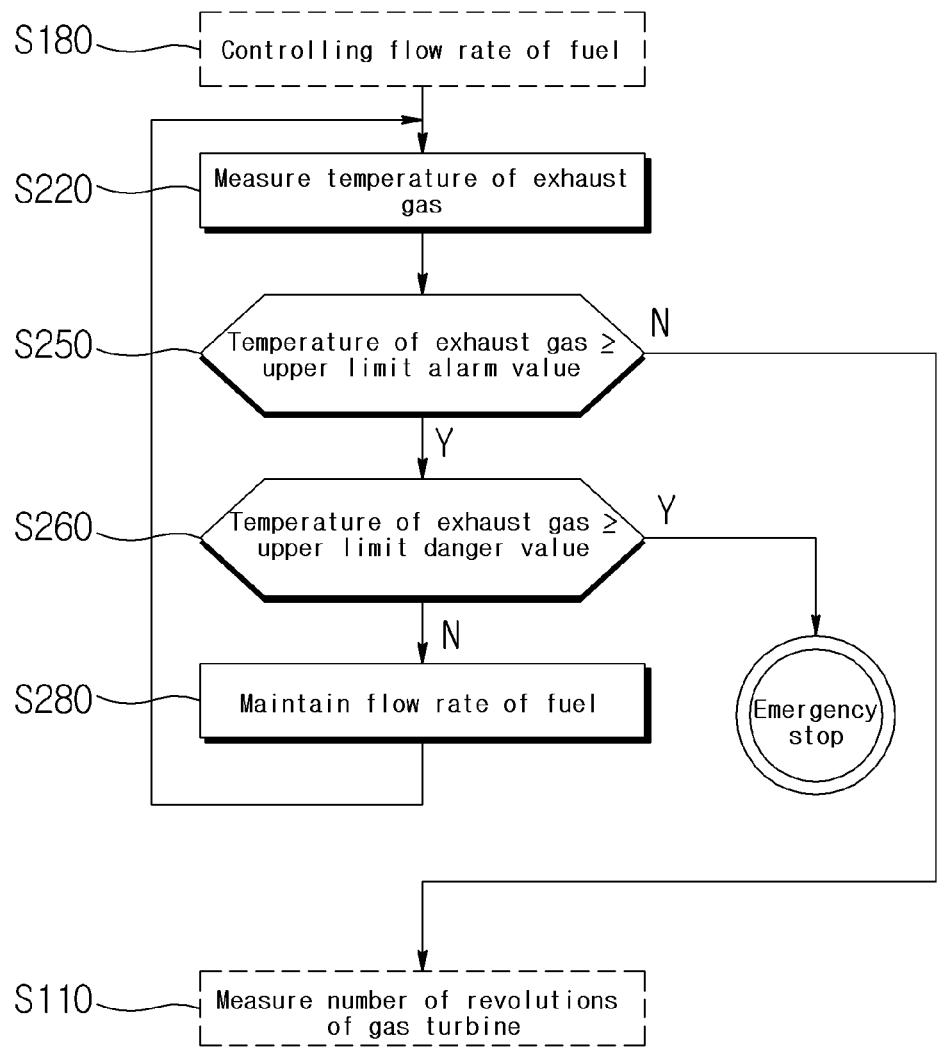

[FIG. 3]
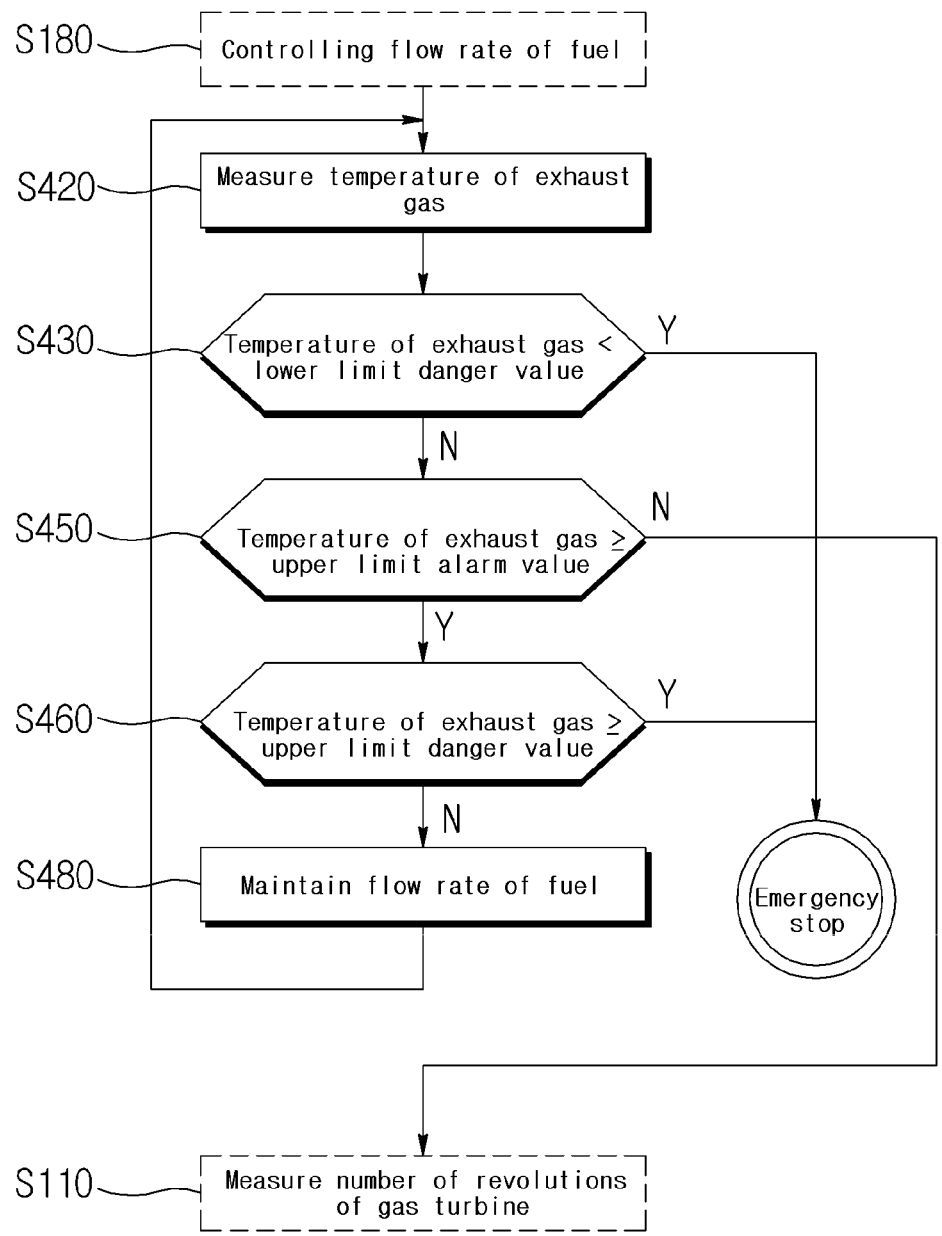

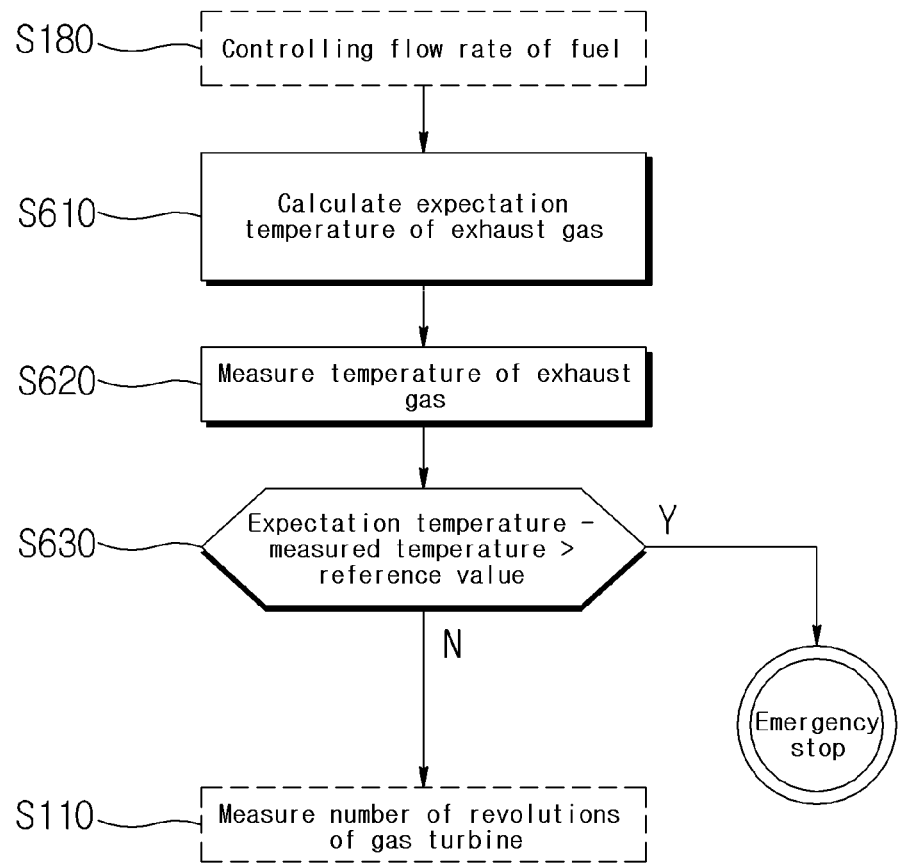
[FIG. 4]

[FIG. 5]
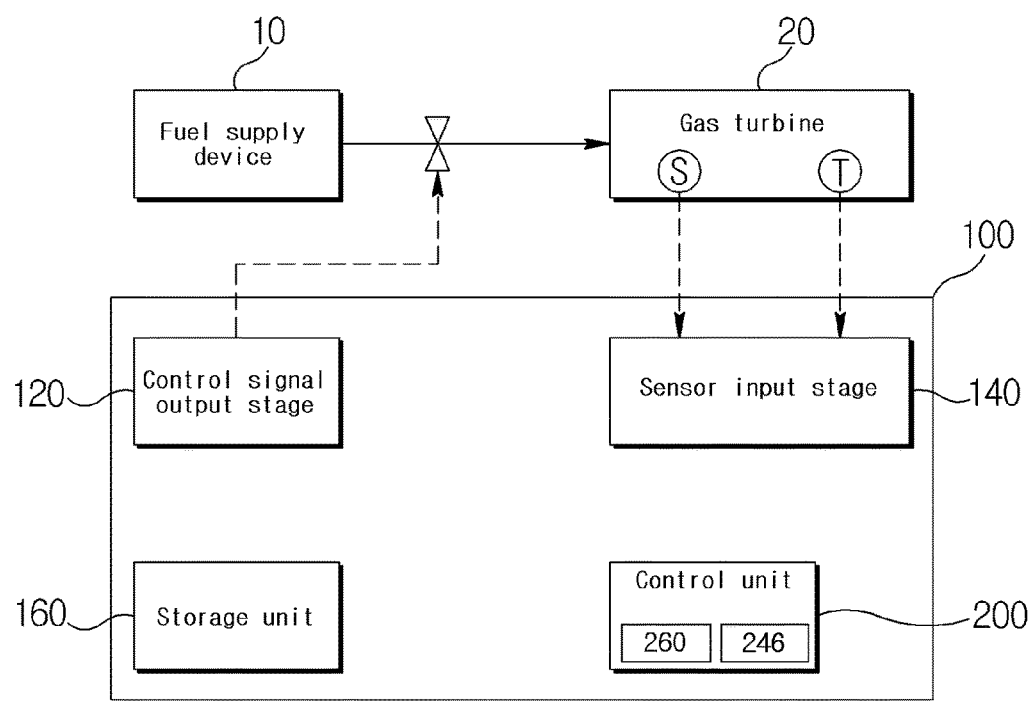

[FIG. 6]
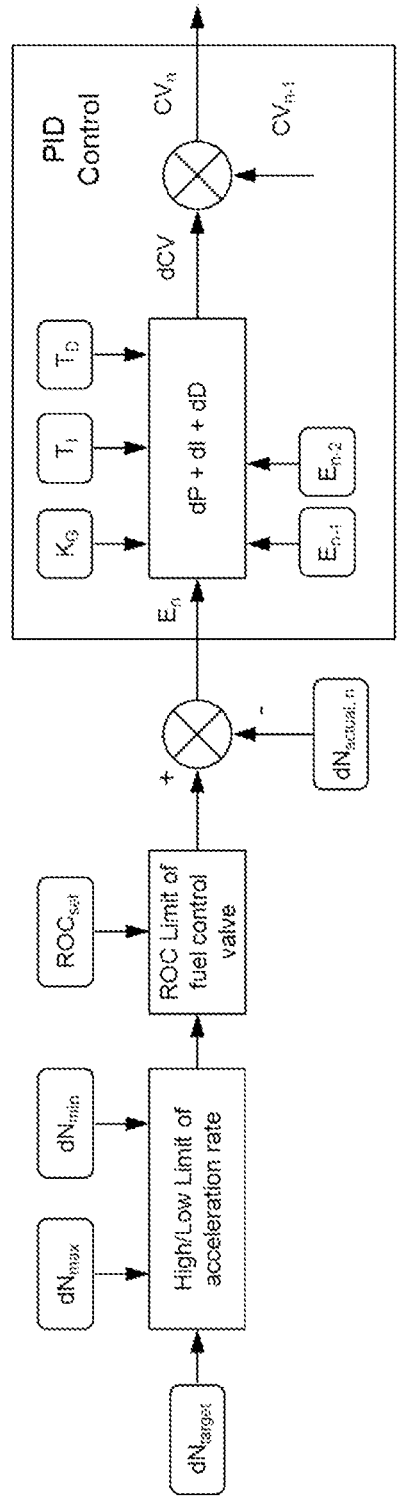

METHOD AND APPARATUS FOR CONTROLLING GAS TURBINE WHEN GAS TURBINE IS STARTED

CROSS-REFERENCE TO RELATED APPLICATION(S)

This application claims priority to Korean Patent Application No. 10-2014-0009020, filed on Jan. 24, 2014, the disclosure of which is incorporated herein by reference in its entirety.

BACKGROUND

Exemplary embodiments of the present disclosure relate to a method and apparatus for controlling a gas turbine when the gas turbine is started, which are capable of improving the starting operation of a gas turbine.

Gas turbines that produce motive power by rotating a turbine using combustion gas generated by combusting fuel gas are being widely used in power generators, etc.

A gas turbine generator generates electric power to be supplied to load devices. Furthermore, the gas turbine generator is a power generation apparatus suitable for a so-called cogeneration system because the waste heat of the gas turbine generator can be recovered as a heat source for heating or hot water.

The cogeneration system that uses the gas turbine generator may also be used as a small-sized power generator used in homes in addition to a large-sized power plant. In the cogeneration system that uses the gas turbine generator, the operation of the gas turbine generator may need to be stopped because there are time periods in which requirements for electric power or waste heat are not significant.

In a gas turbine, that is, the motor of the gas turbine generator, the rate of temperature increase for each component is not constant because an internal temperature is significantly different between a temperature when the gas turbine is stopped (upon cooling) and a temperature when the gas turbine generates electric power. Accordingly, there is a disadvantage in that the lifespan of the gas turbine is reduced due to sudden heat stress applied to components if the time from starting the generator to the time that normal power generation starts (i.e., the starting time) is too short. Furthermore, there is a disadvantage in that a feed power command is not handled quickly if the starting time is too long. Accordingly, there is a need for an improved starting control system capable of driving a gas turbine generator more stably.

BRIEF SUMMARY

A first object of the present disclosure is to provide a method for controlling a gas turbine when the gas turbine is started, wherein the number of rotations of a gas turbine can be reached to a desired level when the gas turbine is started.

A second object of the present disclosure is to make the number of rotations of a gas turbine stably reach a target level without an unstable phenomenon, such as hang or surge, regardless of operation conditions, such as atmospheric pressure and atmospheric temperature that affect the starting time of the gas turbine when the gas turbine is started.

A third object of the present disclosure is to provide a method for controlling a gas turbine when the gas turbine is started, wherein an internal temperature can rapidly reach a target level when the gas turbine is started.

A fourth object of the present disclosure is to provide a method for controlling a gas turbine when the gas turbine is started, which is capable of preparing for the overheating or flame-out of a gas turbine when the gas turbine is started.

In accordance with an aspect of the present disclosure for achieving the first object of the present disclosure, there is provided a method of controlling a gas turbine, wherein rotational speed of the gas turbine is increased to reference starting speed when the gas turbine is started. The method includes measuring the number of rotations of the gas turbine, determining a target acceleration rate based on the number of rotations of the gas turbine, measuring a current acceleration rate, determining a flow rate of fuel based on a difference between the current acceleration rate and the target acceleration rate, and controlling the flow rate of the fuel at the determined flow rate. The flow rate of the fuel may be determined between a maximum flow rate that has been previously stored and a minimum flow rate.

The method may further include monitoring a temperature of an exhaust gas after controlling the flow rate of the fuel.

Determining the target acceleration rate may include determining the target acceleration rate with reference to data of a graph or table form in which a first axis is the number of rotations of the gas turbine and a second axis is the target acceleration rate.

In determining the flow rate of the fuel, a value obtained by subtracting the current acceleration rate from the target acceleration rate may be proportional to the determined flow rate of the fuel in an n-degree (n: a positive real number) equation form.

Monitoring the temperature of the exhaust gas may include measuring a temperature of the exhaust gas of the gas turbine, terminating the monitoring if the measured temperature of the exhaust gas is smaller than a predetermined upper limit alarm value and returning to measuring the number of rotations of the gas turbine, returning to measuring the temperature of the exhaust gas in a state in which the flow rate of the fuel supplied to the gas turbine is maintained if the measured temperature of the exhaust gas is equal to or greater than the predetermined upper limit alarm value and is less than a predetermined upper limit danger value, and performing an emergency stop of the gas turbine if the measured temperature of the exhaust gas is equal to or greater than the predetermined upper limit alarm value.

Monitoring the temperature of the exhaust gas may include measuring a temperature of the exhaust gas of the gas turbine and performing an emergency stop of the gas turbine if the measured temperature of the exhaust gas is less than a predetermined lower limit danger value.

Monitoring the temperature of the exhaust gas may include calculating an expected temperature of the exhaust gas based on the determined flow rate of the fuel, measuring a temperature of the exhaust gas of the gas turbine, and performing an emergency stop of the gas turbine if a difference between the calculated expected temperature and the measured temperature of the exhaust gas is greater than a predetermined reference value and returning to measuring the number of rotations of the gas turbine if the difference is less than the predetermined reference value.

Calculating the expectation temperature may include determining the expected temperature with reference to data of a curve or table form in which a first axis is the flow rate of the fuel and a second axis is the expectation temperature of the exhaust gas.

An apparatus for controlling a gas turbine when the gas turbine is started in accordance with another aspect of the present disclosure may include a rotation detection unit configured to measure the number of rotations of the gas turbine, a storage unit configured to store target acceleration rate data to be applied to the gas turbine when the gas turbine is started, a fuel flow control unit configured to control a flow rate of fuel supplied to the gas turbine, an exhaust temperature measurement unit configured to measure a temperature of an exhaust gas of the gas turbine, and a control unit configured to determine a flow rate of fuel to be supplied to the gas turbine based on the target acceleration rate data and the measured number of rotations of the gas turbine when the gas turbine is started, to control the flow rate of the fuel at the determined flow rate, and to determine whether or not to perform an emergency stop of the gas turbine based on a temperature of the exhaust gas monitored when the gas turbine is started.

The control unit may be configured to determine a target acceleration rate at present time based on the target acceleration rate data, and to calculate a current acceleration rate according to the number of rotations of the gas turbine that has been accumulated and measured. The flow rate of the fuel may be determined based on a difference between the current acceleration rate and the target acceleration rate and controlled with the determined flow rate.

The target acceleration rate data may be data of a graph or table form in which a first axis is the number of rotations of the gas turbine and a second axis is the target acceleration rate.

The control unit may be configured to maintain the flow rate of the fuel supplied to the gas turbine if the measured temperature of the exhaust gas is equal to or greater than a previously stored upper limit alarm value and is less than a previously stored upper limit danger value and to perform an emergency stop of the gas turbine if the measured temperature of the exhaust gas is equal to or greater than the previously stored upper limit danger value.

The control unit may be configured to perform an emergency stop on the gas turbine if the measured temperature of the exhaust gas is less than the previously stored lower limit danger value.

The storage unit may be configured to store expected temperature data of a curve or table form in which a first axis is the flow rate of the fuel and a second axis is an expectation temperature of the exhaust gas.

The control unit may be configured to calculate the expected temperature of the exhaust gas based on the determined flow rate of the fuel and perform an emergency stop on the gas turbine if a difference between the calculated expectation temperature and the measured temperature of the exhaust gas is equal to or greater than a previously stored reference value.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a flowchart illustrating a method for controlling a gas turbine when the gas turbine is started in accordance with an embodiment of the present disclosure;

FIG. 2 is a flowchart illustrating an embodiment of step S200 of monitoring temperature of an exhaust gas in FIG. 1;

FIG. 3 is a flowchart illustrating another embodiment of step S200 of monitoring temperature of an exhaust gas in FIG. 1;

FIG. 4 is a flowchart illustrating yet another embodiment of step S200 of monitoring temperature of an exhaust gas in FIG. 1; and FIG. 5 is a block diagram illustrating gas turbine control system in accordance with an embodiment of the present disclosure.

FIG. 6 illustrates a process of performing PID control by the control unit of the apparatus illustrated in FIG. 5.

DESCRIPTION OF SPECIFIC EMBODIMENTS

Hereinafter, some exemplary embodiments of the present disclosure are described in detail with reference to the accompanying drawings.

In the following description, the term "starting" may include a process of accelerating a gas turbine from a stop state until parameters, such as the number of rotations and temperature of the gas turbine, have stabilized values.

FIG. 1 is a flowchart illustrating a method for controlling the starting of a gas turbine in accordance with an embodiment of the present disclosure.

As illustrated in FIG. 1, the method for controlling the starting of a gas turbine in accordance with an embodiment of the present disclosure includes a gas turbine control method that increases the rotational speed of the gas turbine to a reference starting speed. The method may include step S110 of measuring the number of rotations of the gas turbine, step S120 of determining a target acceleration rate based on the number of rotations of the gas turbine, step S140 of calculating a current acceleration rate, step S160 of determining a flow rate of fuel based on a difference between the current acceleration rate and the target acceleration rate, and step S180 of supplying fuel to the gas turbine at the determined flow rate.

The method may further include step S200 of performing actions depending on temperature by monitoring the temperature of an exhaust gas after step S180.

The number of rotations of the gas turbine measured at step S110 includes the number of rotations of the gas turbine in a predetermined unit time (e.g., rpm or the number of rotations per second). At step S110, the number of rotations of the gas turbine may be measured in such a way as to count the detection value of a speed sensor, installed in the blade shaft of the gas turbine, for a unit time.

During the initial driving of the gas turbine (e.g., when the gas turbine is started), the gas turbine is driven until a target number of rotations of the gas turbine is reached to efficiently drive the gas turbine.

At step S120, the target acceleration rate may be determined based on the number of rotations of the gas turbine measured at step S110. The target acceleration rate may be determined with reference to target acceleration rate data according to the number of rotations of the gas turbine that has been empirically or experimentally obtained. A gas turbine control system may include a storage device for storing the aforementioned acceleration rate data. The acceleration rate data may be designated differently depending on a specification of the gas turbine (or design characteristics) and stored. The data may have a graph or table form in which one axis is the number of rotations of the gas turbine and another axis is a target acceleration rate.

At step S140, the current acceleration rate may be calculated based on the number of rotations of the gas turbine measured at step S110. The acceleration rate of the gas turbine is the number of rotations of the gas turbine per unit time (e.g., hour), and thus the current acceleration rate may be calculated based on the number of rotations of the gas turbine per unit time that has been measured at step S110.

At step S160, the flow rate of fuel may be determined between predetermined minimum and maximum flow rates. More specifically, when the gas turbine is started, the maximum and minimum amount of fuel may be limited in order to avoid hang and surge. Furthermore, the flow rate of fuel may be controlled by Proportional Integral Differential (PID) control so that the gas turbine follows a predetermined target acceleration rate. Furthermore, the gas turbine control system may be a closed loop control in order to improve starting stability regardless of the operation conditions of the gas turbine.

Such PID control is a kind of feedback control in which the output of the system maintains a reference voltage based on an error between a control parameter and a reference input value and is a combination of proportional control, proportional-integral control, and proportional-derivative control.

In an embodiment of the present disclosure, if the current acceleration rate is smaller than the target acceleration rate and the current acceleration rate is proportionally increased, control is performed such that the flow rate of fuel is increased according to an increase of the current acceleration rate (e.g., proportional control). If the current acceleration rate is greater than the target acceleration rate and the current acceleration rate is unable to be proportionally increased, the flow rate of fuel is set based on proportional integral or proportional derivative control.

That is, at step S160, first, the target acceleration rate determined at step S120 is compared with the current acceleration rate calculated at step S140. If the current acceleration rate is smaller than the target acceleration rate, the flow rate of fuel is determined based on a value obtained by subtracting the current acceleration rate from the target acceleration rate. In this case, the flow rate of fuel may be increased to cause an increase of the acceleration rate of the gas turbine because the flow rate of fuel may safely be increased. For example, the value obtained by subtracting the current acceleration rate from the target acceleration rate may be proportional to the determined flow rate of fuel in the form of an n-degree (n: a positive real number) equation.

If the current acceleration rate is greater than the target acceleration rate, the flow rate of fuel may be determined to be a value lower than a value when the current acceleration rate is smaller than the target acceleration rate. This may be checked depending on whether the value obtained by subtracting the target acceleration rate from the current acceleration rate is greater than a predetermined reference value.

If the current acceleration rate is much greater than the target acceleration rate and thus a value obtained by subtracting the target acceleration rate from the current acceleration rate is very different from a predetermined reference value, it may be determined to be abnormal and thus the gas turbine may be subject to an emergency stop.

At step S180, the gas turbine control system controls a fuel control valve and supplies fuel at the flow rate determined at step S160.

At step S200, the detection value of a temperature sensor installed on the exhaust port side of the gas turbine may be received. At step S200, whether the gas turbine is normal or abnormal may be determined based on the received temperature value, and actions may be taken based on a result of the determination.

FIG. 2 is a flowchart illustrating an embodiment of step S200 of monitoring temperature of an exhaust gas in FIG. 1. Processes of FIG. 2 may be performed after step S180 of controlling the flow rate of fuel in FIG. 1.

In the illustrated embodiment, step S200 may include step S220 of measuring temperature of the exhaust gas of the gas turbine, step S250 of terminating the monitoring if the measured temperature of the exhaust gas is less than a predetermined upper limit alarm value and returning to step S110 of measuring the number of rotations of the gas turbine in FIG. 1, step 260 of determining if the measured exhaust gas is equal to or greater than the predetermined upper limit danger value, step S280 of maintaining the flow rate of fuel supplied to the gas turbine and returning to step S220 if the measured temperature of the exhaust gas does not exceed a predetermined upper limit danger value at step S260, and step of performing an emergency stop on the gas turbine if the measured temperature of the exhaust gas is equal to or greater than the predetermined upper limit danger value at step S260.

The gas turbine control system may store the upper limit alarm value and the upper limit danger value used at step S250 and step S260 in advance. The upper limit alarm value may be the temperature of the exhaust gas of the gas turbine at which control of the gas turbine needs to be changed in order to protect the gas turbine. The upper limit danger value is the temperature of the exhaust gas of the gas turbine at which the gas turbine needs to be subject to an emergency stop.

If the measured temperature of the exhaust gas is equal to or greater than the upper limit alarm value and does not exceed the upper limit danger value at step S260, the flow rate of fuel supplied to the gas turbine may be maintained at step S280. Thereafter, when the control process returns to the step S220, a gas turbine overheating warning message may be output to the person in charge or an operator using a visual and/or auditory method.

At step S280, it has been illustrated that the flow rate of fuel supplied to the gas turbine is maintained, but this is not required. The flow rate of fuel may be reduced, for example, based on PID control to achieve advantages such as driving the gas turbine more stably.

The process of performing an emergency stop of the gas turbine may be similar to a normal emergency stop process during the gas turbine operation. An emergency stop message may be output to the person in charge or an operator using a visual and/or auditory method, if desired.

An over-EGT (Exhaust Gas Temperature) method to limit temperature of the exhaust gas has been applied in the illustrated processes to protect the gas turbine during starting. If the upper limit alarm value is reached at step S250, the temperature of the exhaust gas may be monitored without increasing the flow rate of fuel until the temperature of the exhaust gas is less than the upper limit alarm value. If the temperature of the exhaust gas continues to rise and becomes equal to or greater than the upper limit danger value (e.g., a trip limit) at step S260 in the state in which the flow rate of fuel has not been increased, the gas turbine may be subject to an emergency stop (ESD).

FIG. 3 is a flowchart illustrating another embodiment of step S200 of monitoring temperature of an exhaust gas in FIG. 1. Processes of FIG. 3 may be performed after step S180 of controlling the flow rate of fuel in FIG. 1.

In the illustrated embodiment, step S200 may include step S420 of measuring the temperature of the exhaust gas of the gas turbine, step S430 of determining if the measured temperature of the exhaust gas is less than a predetermined lower limit danger value and performing an emergency stop of the gas turbine if the measured temperature is less than the predetermined lower limit danger value, step S450 of determining if the measured temperature of the exhaust gas is equal to or greater than a predetermined upper limit alarm value and terminating the monitoring and returning to step S110 of FIG. 1 if the measured temperature does not exceed the predetermined upper limit value and the measured temperature of the exhaust gas is equal to or greater than the predetermined lower limit danger value at step S430, step S480 of maintaining the flow rate of fuel supplied to the gas turbine and returning to step S420 if the measured temperature of the exhaust gas is equal to or greater than the predetermined upper limit alarm value at step S450 and is less than a predetermined upper limit danger value at step S460, and step 460 of determining if the measured temperature of the exhaust gas is equal to or greater than the predetermined upper limit danger value and performing an emergency stop if the measured temperature if equal to or greater than the predetermined upper limit danger value.

The processes of monitoring the upper limit alarm value and the upper limit danger value and taking measures are similar to those of FIG. 2, and thus redundant descriptions thereof are omitted.

The gas turbine control system may store the lower limit danger value used at step S430 in advance.

The lower limit danger value may be used to apply flame-out protection logic to protect the gas turbine when the gas turbine is started. The lower limit danger value may be a predetermined reference temperature or may be a value compared with a previously measured temperature. In the latter case, the lower limit danger value may be a previously measured temperature value or may be a temperature value obtained by subtracting a specific value (about 10° C.) from the previously measured temperature value. In such a case if a flame-out occurs, the temperature of the exhaust gas may not increase or may decrease.

In the flowchart of FIG. 3, if the measured temperature of the exhaust gas is between the lower limit danger value and the upper limit alarm value, the process returns to step S110 of FIG. 1. If the measured temperature of the exhaust gas is less than the lower limit danger value or equal to or greater than the upper limit danger value, the gas turbine is subject to an emergency stop. If the measured temperature of the exhaust gas is between the upper limit danger value and the upper limit alarm value, the process returns to step S420 in the state in which the flow rate of fuel is maintained.

In the aforementioned embodiment, a corresponding message may be output to the person in charge and/or an operator using a visual and/or auditory method in the state in which the gas turbine has been subjected to an emergency stop or the flow rate of fuel is maintained.

FIG. 4 is a flowchart illustrating yet another embodiment of step S200 of monitoring temperature of an exhaust gas in FIG. 1. Processes of FIG. 4 may be performed after step S180 of controlling the flow rate of fuel in FIG. 1.

In the illustrated embodiment, step S200 may include step S610 of calculating an expected temperature of the exhaust gas based on the flow rate of fuel that has been determined at step S160 and supplied at step S180, step S620 of measuring the temperature of the exhaust gas of the gas turbine, and step S630 of determining if a difference between the calculated expected temperature and the measured temperature of the exhaust gas exceeds a predetermined reference value and performing an emergency stop of the gas turbine if it is determined that the difference exceeds the predetermined reference value or returning to step S110 if it is determined that the difference does not exceed the predetermined reference value.

Although not illustrated, as in FIGS. 2 and 3, the processes of monitoring the upper limit alarm value and the upper limit danger value and taking measures may be additionally performed after step S630.

The emergency stop at step S630 may apply flame-out protection logic in order to protect the gas turbine when the gas turbine is started. The gas turbine control system may check whether an expected temperature of an exhaust gas in the flow rate of fuel determined at step S160 has been reached, may determine that flame-out has occurred if the expected temperature of the exhaust gas is not reached, and may perform an emergency stop of the gas turbine. The expected temperature at step S610 may be determined with reference to data of a curve (or graph) or table form in which one axis is the flow rate of fuel and another axis is the expected temperature of the exhaust gas.

The reference value may be used to continue starting of the gas turbine without performing an emergency stop when the measured temperature of the exhaust gas does not reach the expected temperature, but a difference between the measured temperature and the expected temperature is very slight. If such a slight difference has already been incorporated into the curve or table, the reference value may be set close to 0.

The gas turbine control system may store the reference value used at step S630 and/or the reference curve (or table) used at step S610 in advance.

In the aforementioned embodiment, a corresponding message may be output to the person in charge and/or an operator using a visual and/or auditory method in the state in which an emergency stop has been performed on the gas turbine.

FIG. 5 is a block diagram illustrating gas turbine control system in accordance with an embodiment of the present disclosure.

An apparatus 100 for controlling a gas turbine may include a rotation detection unit configured to measure the number of rotations of a gas turbine 20, a storage unit 160 configured to store a target acceleration rate data to be applied to the gas turbine when the gas turbine is started, a fuel flow control unit configured to control a flow rate of fuel supplied to the gas turbine 20, an exhaust temperature measurement unit configured to measure a temperature of the exhaust gas of the gas turbine 20, and a control unit 200. The control unit 200 may determine a flow rate of fuel to be supplied to the gas turbine 20 based on the target acceleration rate data and the measured number of rotations of the gas turbine when the gas turbine is started and supply fuel to the gas turbine at the determined flow rate. Furthermore, the control unit 200 may perform an emergency stop of the gas turbine based on the temperature of the exhaust gas that is monitored when the gas turbine is started.

The rotation detection unit may be implemented using a rotation sensor input stage configured to receive a sensing signal from a rotation sensor installed in the axis of the gas turbine 20. The exhaust temperature measurement unit may be implemented using a temperature sensor input stage configured to receive a sensing signal from a temperature sensor installed on the exhaust port side of the gas turbine 20. The rotation sensor and temperature sensor input stages may be integrated into a sensor input stage 140, as illustrated in FIG. 5 but may also be separate. The sensor input stage 140 is illustrated in FIG. 5 as a combined stage for clarity and simplicity in the drawing.

The control unit 200 may control the operation of the control signal output stage 120 in order to control a flow rate of fuel to be supplied to the gas turbine. The control signal output stage 120 may control a valve installed between the gas turbine 20 and a fuel supply device 10.

The storage unit 160 may be volatile and/or non-volatile memory inside the apparatus 100 or may be a database device outside the apparatus 100.

The control unit 200 may include a single processor or multiple processors configured to perform a method for controlling starting of a gas turbine in accordance with one or more embodiments of the present disclosure.

For example, the control unit 200 may determine a target acceleration rate based on target acceleration rate data and calculate a current acceleration rate based on the number of rotations of the gas turbine that has been accumulated and measured over a period of time. The control unit 200 may determine a flow rate of fuel based on a difference between the current acceleration rate and the target acceleration rate and control the flow rate of fuel supplied to the gas turbine so that the flow rate of the supplied fuel becomes the determined flow rate. In this case, the target acceleration rate data may be data of a graph or table form in which one axis is the number of rotations of the gas turbine and another axis is the target acceleration rate. The target acceleration rate data may have been stored in the storage unit 160.

Furthermore, if the measured temperature of the exhaust gas is equal to or greater than a predetermined upper limit alarm value and less than a predetermined upper limit danger value, the control unit 200 maintains the flow rate of fuel supplied to the gas turbine. If the measured temperature of the exhaust gas is equal to or greater than the upper limit danger value, the control unit 200 may perform an emergency stop of the gas turbine.

Alternatively, if the measured temperature of the exhaust gas is less than the predetermined lower limit danger value, the control unit 200 may perform an emergency stop of the gas turbine.

The control unit 200 may calculate an expected temperature of the exhaust gas based on the determined flow rate of fuel and predetermined expected temperature data. If a difference between the calculated expected temperature and the measured temperature of the exhaust gas exceeds a predetermined reference value, the control unit 200 may perform an emergency stop of the gas turbine. The storage unit 160 may store the expected temperature data in a curve or table form in which one axis is the flow rate of fuel and another axis is the expected temperature of the exhaust gas.

FIG. 6 illustrates a process of performing PID control that may be performed by the control unit 200 illustrated in FIG. 5.

As illustrated in FIG. 6, the PID control to control of a flow rate of fuel includes a target acceleration rate $dN_{target}$, a maximum acceleration rate $dN_{max}$, and a minimum acceleration rate $dN_{min}$ and calculates the upper and/or lower limit of the acceleration rate of the gas turbine. An opening rate limit value of the valve disposed between the gas turbine and the fuel supply device is determined based on the values. The opening rate limit value of the valve may be determined based on an opening rate-of-change value $ROC_{set}$ of the valve according to a previously stored acceleration rate of the gas turbine.

After the upper or lower limit of the acceleration rate of the gas turbine and the opening rate limit value of the valve are calculated as described above, an error $E_n$ between an actual acceleration rate $dN_{actual,n}$ and the target acceleration rate $dN_{target}$ is calculated, PID control is performed using the calculated error value $E_n$.

That is, an increment dCV of the acceleration rate control value of the gas turbine is calculated by incorporating error values $E_n$, $E_{n-1}$, $E_{n-2}$, ..., calculated based on a changing acceleration rate of the gas turbine, a proportional constant $K_G$, an integral time $T_i$, and a derivative time $T_d$ into the flow rate of fuel. A control value $CV_n$ is calculated by incorporating the increment dCV of the acceleration rate control value of the gas turbine into control of the acceleration rate of the gas turbine in the current time. The opening rate of the valve is controlled based on the control value $CV_n$ of the acceleration rate of the gas turbine.

The increment dCV of the acceleration rate control value of the gas turbine and the control value $CV_n$ of the acceleration rate of the gas turbine in the current time may be calculated as follows.

$$dCV = K_p(E_n - E_{n-1}) + K_i * E_n + K_d\left(\frac{(E_n - E_{n-1}) -}{(E_{n-1} - E_{n-2})}\right) \quad (1)$$

$$= K_G\left[\begin{array}{c}(E_n - E_{n-1}) + ScanRate/T_i * E_n + \\ T_d / ScanRate\left(\frac{(E_n - E_{n-1}) -}{(E_{n-1} - E_{n-2})}\right)\end{array}\right]$$

$$CV_n = CV_{n-1} + dCV \quad (2)$$

(the acceleration rate control value of the gas turbine (the degree of opening of the valve) is controlled at a time $t_n$ (current scan)

The aforementioned parameters may be defined as follows:

$dN_{target}$: A target acceleration rate of the gas turbine
$dN_{max}$: A maximum acceleration rate of the gas turbine
$dN_{min}$: A minimum acceleration rate of the gas turbine
$ROC_{set}$: An opening rate-of-change value of the fuel control valve
$dN_{actual,n}$: An actual acceleration rate of the gas turbine at present time (i.e., a time $t_n$)
$E_n = (dN_{target} - dN_{actual}, t/_{n-1})$: An error attributable to a difference between the target acceleration rate and a current acceleration rate at the time $t_{n-1}$ (i.e., current scan)
$E_{n-1} = (dN_{target} - dN_{actual}/t_{n-1})$ An error attributable to a difference between the target acceleration rate and a current acceleration rate at a time $t_{n-1}$ (i.e., previous scan)
$E_{n-1} = (dN_{target} - dN_{actual}, /t_{n-2})$: An error attributable to a difference between the target acceleration rate and a current acceleration rate at a time $t_{n-2}$ (i.e., scan prior to 2 steps)
$K_G$: Proportional gain ($=K_p$)
$T_i$: Integral time
$T_d$: Derivative time
$K_i$: Integral gain ($=K_G*ScanRate/T_i$)
$K_d$: Differential gain ($=K_G*T_d/ScanRate$)
ScanRate=scan rate of a control algorithm
dP=Proportional portion of the control algorithm
dI=Integral portion of the control algorithm
dD=Derivative portion of the control algorithm The flow rate of fuel is determined between a maximum flow rate of fuel and a minimum flow rate of fuel set by an upper limit fuel flow setting unit 220 and a lower limit fuel flow setting unit 240. The maximum flow rate of fuel and the minimum flow rate of fuel may be fixed values or may be values determined based on a target acceleration rate or a current acceleration rate.

In the example of FIG. 6, the maximum flow rate of fuel and the minimum flow rate of fuel are determined based on a target acceleration rate or a current acceleration rate. The upper limit fuel flow setting unit 220 and the lower limit fuel flow setting unit 240 may include an acceleration rate upper/lower limit setting unit 220 configured to determine a maximum acceleration rate and a minimum acceleration rate based on a target acceleration rate or a current acceleration rate and a fuel flow setting/control unit 240 configured to determine a maximum flow rate of fuel and a minimum flow rate of fuel based on the determined maximum acceleration rate and minimum acceleration rate.

A maximum acceleration rate and minimum acceleration rate of the gas turbine may have values determined based on a target acceleration rate or a current acceleration rate. Maximum/minimum acceleration rate data regarding the target acceleration rate (or the current acceleration rate) and the maximum acceleration rate and the minimum acceleration rate allocated to the target acceleration rate (or the current acceleration rate) may be stored in the storage unit 160.

Some of the blocks of the control unit 200 may include a summer 260 for subtraction configured to calculate a difference between a predetermined acceleration rate and an actual acceleration rate and a summer 246 configured to calculate an increment dCV of the acceleration rate control value of the gas turbine into which an error has been incorporated.

In this case, the increment dCV of the acceleration rate control value of the gas turbine calculated by the summer 246 is expressed in Equation 1 and Equation 2 below.

$$dCV = K_p(E_n - E_{n-1}) + K_i * E_n + K_d\left(\frac{(E_n - E_{n-1}) - }{(E_{n-1} - E_{n-2})}\right) \quad (1)$$

$$= K_G\left[\begin{array}{c}(E_n - E_{n-1}) + ScanRate/T_i * E_n + \\ T_d \Big/ ScanRate\left(\frac{(E_n - E_{n-1}) - }{(E_{n-1} - E_{n-2})}\right)\end{array}\right]$$

$$CV_n = CV_{n-1} + dCV \quad (2)$$

(the acceleration rate control value of the gas turbine (the degree of opening of the valve) is controlled at a time $t_n$ (current scan)

Performing the described method for controlling the starting of a gas turbine may provide advantages in that the number of rotations and/or an internal temperature of the gas turbine when the gas turbine is started can reach a desired level.

More specifically, the gas turbine can be started stably without a phenomenon such as hang or surge, regardless of operation conditions, such as atmospheric pressure and air temperature that affect the starting time of the gas turbine. Accordingly, there are advantages in that high starting reliability can be obtained and the lifespan of a gas turbine design can be improved.

Alternatively, the method for controlling a gas turbine when the gas turbine is started according to the present disclosure has an advantage in that the overheating or flame-out of the gas turbine can be reduced.

While the present disclosure has been particularly shown and described with reference to exemplary embodiments thereof, it will be understood by those of ordinary skill in the art that various changes and modifications may be made therein without departing from the technical idea and scope of the present disclosure and such changes and modifications belong to the claims of the present disclosure. Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method for controlling starting of a gas turbine, comprising:
   measuring a number of rotations of the gas turbine;
   determining a target acceleration rate of the gas turbine based on the number of rotations of the gas turbine;
   calculating a current acceleration rate of the gas turbine;
   determining a flow rate of fuel to be supplied to the gas turbine based on a difference between the current acceleration rate and the target acceleration rate, the determined flow rate of the fuel being between a maximum flow rate of the fuel that has been previously stored and a minimum flow rate of the fuel;
   supplying the fuel to the gas turbine at the determined flow rate of the fuel; and
   monitoring a temperature of an exhaust gas after supplying the fuel, the monitoring the temperature of the exhaust gas including:
      measuring the temperature of the exhaust gas;
      terminating the monitoring if the measured temperature of the exhaust gas is smaller than a predetermined upper limit alarm value and returning to measuring the number of rotations of the gas turbine;
      returning to measuring the temperature of the exhaust gas in a state in which the flow rate of the fuel supplied to the gas turbine is maintained if the measured temperature of the exhaust gas is equal to or greater than the predetermined upper limit alarm value and is less than a predetermined upper limit danger value; and
      performing an emergency stop of the gas turbine if the measured temperature of the exhaust gas is equal to or greater than the predetermined upper limit danger value.

2. The method according to claim 1, wherein monitoring the temperature of the exhaust gas includes performing the emergency stop of the gas turbine if the measured temperature of the exhaust gas is less than a predetermined lower limit danger value.

3. An apparatus for controlling a gas turbine, comprising:
a rotation detection unit configured to measure a number of rotations of the gas turbine;
a storage unit configured to store target acceleration rate data to be applied to the gas turbine when the gas turbine is started;
a fuel flow control unit configured to control a flow rate of fuel supplied to the gas turbine;
an exhaust temperature measurement unit configured to measure a temperature of an exhaust gas of the gas turbine; and
a control unit configured to
　determine a flow rate of fuel to be supplied to the gas turbine based on the target acceleration rate data and the measured number of rotations of the gas turbine when the gas turbine is started,
　supply the fuel at the determined flow rate,
　determine whether or not to perform an emergency stop of the gas turbine based on a temperature of the exhaust gas monitored when the gas turbine is started,
　maintain the flow rate of the fuel supplied to the gas turbine if the measured temperature of the exhaust gas is equal to or greater than a previously stored upper limit alarm value and is less than a previously stored upper limit danger value, and
　perform the emergency stop of the gas turbine if the measured temperature of the exhaust gas is equal to or greater than the previously stored upper limit danger value.

4. The apparatus according to claim 3, wherein the control unit is configured to
　determine a target acceleration rate based on the target acceleration rate data,
　calculate a current acceleration rate based on the number of rotations of the gas turbine, and
　determine the flow rate of the fuel based on a difference between the current acceleration rate and the target acceleration rate.

5. The apparatus according to claim 3, wherein the target acceleration rate data is data of a graph or table form in which a first axis is the number of rotations of the gas turbine and a second axis is the target acceleration rate.

6. The apparatus according to claim 3, wherein the control unit is configured to perform the emergency stop of the gas turbine if the measured temperature of the exhaust gas is less than a previously stored lower limit danger value.

7. The apparatus according to claim 3, wherein the storage unit is configured to store expected temperature data in a curve or table form in which a first axis is the flow rate of the fuel and a second axis is an expected temperature of the exhaust gas.

8. The apparatus according to claim 7, wherein the control unit is configured to
　calculate the expected temperature of the exhaust gas based on the determined flow rate of the fuel, and
　perform an emergency stop of the gas turbine if a difference between the calculated expected temperature and the measured temperature of the exhaust gas is equal to or greater than a previously stored reference value.

9. The apparatus according to claim 4, wherein the control unit is configured to apply the determined flow rate of the fuel to Proportional Integral Differential (PID) control.

10. The apparatus according to claim 9, wherein the control unit is configured to
　increase the flow rate of the fuel if the current acceleration rate is less than the target acceleration rate, and
　decrease the flow rate of the fuel if the current acceleration rate is equal to or greater than the target acceleration rate.

* * * * *